United States Patent
Weatherhead et al.

(10) Patent No.: US 8,601,435 B2
(45) Date of Patent: Dec. 3, 2013

(54) MODULE CLASS SUBSETS FOR INDUSTRIAL CONTROL

(75) Inventors: N. Andrew Weatherhead, Ayr (CA); Mark K. Carmount, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1114 days.

(21) Appl. No.: 11/774,824

(22) Filed: Jul. 9, 2007

(65) Prior Publication Data

US 2008/0098351 A1    Apr. 24, 2008

Related U.S. Application Data

(60) Provisional application No. 60/862,403, filed on Oct. 20, 2006.

(51) Int. Cl.
*G06F 9/44* (2006.01)

(52) U.S. Cl.
USPC ........................................... 717/107

(58) Field of Classification Search
USPC ................................. 717/100–108
See application file for complete search history.

(56) References Cited

U.S. PATENT DOCUMENTS

| | | |
|---|---|---|
| 3,928,772 A | 12/1975 | Mooney |
| 4,118,635 A | 10/1978 | Barrett et al. |
| 4,215,396 A | 7/1980 | Henry |
| 4,519,027 A | 5/1985 | Vogelsberg |
| 4,570,217 A | 2/1986 | Allen et al. |
| 4,581,701 A | 4/1986 | Hess et al. |
| 4,602,324 A | 7/1986 | Fujawa et al. |
| 4,910,691 A | 3/1990 | Skeirik |
| 4,985,824 A | 1/1991 | Husseiny et al. |
| 4,990,057 A | 2/1991 | Rollins |
| 5,058,043 A | 10/1991 | Skeirik |
| 5,068,778 A | 11/1991 | Kosem et al. |
| 5,088,024 A | 2/1992 | Vernon et al. |
| 5,214,577 A | 5/1993 | Sztipanovits et al. |
| 5,255,197 A | 10/1993 | Iida |
| 5,262,954 A | 11/1993 | Fujino et al. |
| 5,388,318 A | 2/1995 | Petta |
| 5,420,977 A | 5/1995 | Sztipanovits et al. |
| 5,450,346 A | 9/1995 | Krummen et al. |
| 5,555,179 A | 9/1996 | Koyama et al. |
| 5,673,194 A | 9/1997 | Cipelletti et al. |

(Continued)

FOREIGN PATENT DOCUMENTS

EP        1770464        4/2007

OTHER PUBLICATIONS

The Instrumentation System, and Automation society, "Batch Control, Part 1: Models and Terminology", 1995, The Instrument Society of America, 95 pages.*

(Continued)

*Primary Examiner* — Ted T Vo

(74) *Attorney, Agent, or Firm* — Turocy & Watson, LLP; Alexander Kuszewski; John M. Miller

(57) ABSTRACT

A system that facilitates module design in an industrial environment is provided. The system includes a module component that defines operations to control an industrial process. At least one class component is defined within the module that identifies a generic operation for the module, where the class component executes one or more of the operations within the industrial control process.

24 Claims, 12 Drawing Sheets

(56) References Cited

U.S. PATENT DOCUMENTS

| | | |
|---|---|---|
| 5,751,582 A | 5/1998 | Saxena et al. |
| 5,880,954 A | 3/1999 | Thomson et al. |
| 5,920,717 A | 7/1999 | Noda |
| 5,933,347 A | 8/1999 | Cook et al. |
| 5,946,212 A | 8/1999 | Bermon et al. |
| 6,008,985 A | 12/1999 | Lake et al. |
| 6,061,600 A | 5/2000 | Ying |
| 6,289,252 B1 | 9/2001 | Wilson et al. |
| 6,397,114 B1 | 5/2002 | Eryurek et al. |
| 6,449,624 B1 | 9/2002 | Hammack et al. |
| 6,459,944 B1 | 10/2002 | Maturana et al. |
| 6,501,995 B1 | 12/2002 | Kinney et al. |
| 6,527,018 B2 | 3/2003 | Yamauchi et al. |
| 6,535,769 B1 | 3/2003 | Konar |
| 6,563,891 B1 | 5/2003 | Eriksson et al. |
| 6,615,091 B1 | 9/2003 | Birchenough et al. |
| 6,622,155 B1 | 9/2003 | Haddon et al. |
| 6,662,061 B1 | 12/2003 | Brown |
| 6,675,324 B2 | 1/2004 | Marisetty et al. |
| 6,708,104 B2 | 3/2004 | Avery et al. |
| 6,760,630 B2 | 7/2004 | Tumaus et al. |
| 6,832,118 B1 | 12/2004 | Heberlein et al. |
| 6,853,920 B2 | 2/2005 | Hsiung et al. |
| 6,859,755 B2 | 2/2005 | Eryurek et al. |
| 6,865,432 B2 | 3/2005 | Brown |
| 6,996,741 B1 | 2/2006 | Pittelkow et al. |
| 7,058,712 B1 | 6/2006 | Vasko et al. |
| 7,089,155 B2 | 8/2006 | Hegel |
| 7,089,530 B1 | 8/2006 | Dardinski et al. |
| 7,117,504 B2 | 10/2006 | Smith et al. |
| 7,123,978 B2 | 10/2006 | Hartman et al. |
| 7,149,595 B2 | 12/2006 | D'Mura |
| 7,162,534 B2 | 1/2007 | Schleiss et al. |
| 7,171,281 B2 | 1/2007 | Weber et al. |
| 7,249,356 B1 | 7/2007 | Wilson et al. |
| 7,254,457 B1 | 8/2007 | Chen et al. |
| 7,289,861 B2 | 10/2007 | Aneweer et al. |
| 7,307,986 B2 | 12/2007 | Henderson et al. |
| 7,313,453 B2 | 12/2007 | Kline |
| 7,333,024 B2 | 2/2008 | Nickolaou et al. |
| 7,415,708 B2 | 8/2008 | Knauerhase et al. |
| 7,424,331 B2 | 9/2008 | Patel |
| 7,506,090 B2 | 3/2009 | Rudnick et al. |
| 7,620,465 B2 | 11/2009 | Degoul et al. |
| 7,725,200 B2 * | 5/2010 | Reed et al. .................. 700/30 |
| 2001/0049562 A1 | 12/2001 | Takano et al. |
| 2002/0010908 A1 | 1/2002 | Cheng et al. |
| 2002/0042896 A1 | 4/2002 | Johnson et al. |
| 2002/0059467 A1 | 5/2002 | Rapp et al. |
| 2002/0100014 A1 | 7/2002 | Iborra et al. |
| 2003/0051071 A1 | 3/2003 | Stefansson et al. |
| 2003/0149756 A1 | 8/2003 | Grieve et al. |
| 2003/0177018 A1 | 9/2003 | Hughes |
| 2003/0220709 A1 | 11/2003 | Hartman et al. |
| 2004/0095833 A1 | 5/2004 | Marisetty et al. |
| 2004/0158713 A1 | 8/2004 | Aneweer et al. |
| 2004/0172612 A1 | 9/2004 | Kasravi et al. |
| 2004/0181294 A1 | 9/2004 | Deitz et al. |
| 2004/0243260 A1 | 12/2004 | Law et al. |
| 2004/0267515 A1 | 12/2004 | McDaniel et al. |
| 2005/0004781 A1 | 1/2005 | Price et al. |
| 2005/0015769 A1 | 1/2005 | Gegner |
| 2005/0028133 A1 | 2/2005 | Ananth et al. |
| 2005/0125512 A1 | 6/2005 | Fuller et al. |
| 2005/0227217 A1 | 10/2005 | Wilson |
| 2006/0026193 A1 | 2/2006 | Hood |
| 2006/0085084 A1 | 4/2006 | Nickolaou et al. |
| 2006/0101433 A1 | 5/2006 | Opem et al. |
| 2006/0230383 A1 | 10/2006 | Moulckers et al. |
| 2006/0259157 A1 | 11/2006 | Thurner |
| 2006/0265688 A1 | 11/2006 | Carlson et al. |
| 2006/0265695 A1 | 11/2006 | Arai |
| 2007/0061125 A1 | 3/2007 | Bhatt et al. |
| 2007/0089100 A1 | 4/2007 | Morris et al. |
| 2007/0100486 A1 | 5/2007 | Burda et al. |
| 2007/0101193 A1 | 5/2007 | Johnson et al. |
| 2007/0162268 A1 | 7/2007 | Kota et al. |
| 2007/0186090 A1 | 8/2007 | Yu et al. |
| 2007/0220483 A1 | 9/2007 | Motoyama et al. |
| 2007/0234283 A1 | 10/2007 | Baluja et al. |
| 2007/0261027 A1 | 11/2007 | Dhanakshirur et al. |
| 2007/0269297 A1 | 11/2007 | Meulen et al. |
| 2007/0294450 A1 | 12/2007 | Rudnick et al. |
| 2008/0082186 A1 | 4/2008 | Hood et al. |
| 2008/0097624 A1 | 4/2008 | Weatherhead et al. |
| 2008/0120129 A1 | 5/2008 | Seubert et al. |
| 2008/0126407 A1 | 5/2008 | Shimaoka et al. |
| 2008/0188960 A1 | 8/2008 | Nixon et al. |

OTHER PUBLICATIONS

Maffezzoni et al., "Object-oriented models for advanced automation engineering", Apr. 1999, Control Engineering Practice 7, pp. 957-968.*

Siemens, "Simatic Batch Getting Started", Parts 1 to 4, Jan. 2005, Siemens AG, 196 pages.*

OA dated Mar. 28, 2012 for U.S. Appl. No. 11/856,118, 55 pages.

* cited by examiner

MODULE CLASS SUBSETS FOR INDUSTRIAL CONTROL

CROSS REFERENCE TO RELATED APPLICATION

This application claims the benefit of U.S. Provisional Patent Application No. 60/862,403 entitled MODULE CONTROL AND STATE PROPAGATION, and filed on Oct. 20, 2006, the entirety of which is incorporated herein by reference.

TECHNICAL FIELD

The claimed subject matter relates generally to industrial control systems and more particularly to module class components that are defined to facilitate software re-use and mitigate manual coding operations.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (i.e., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

A problem that has evolved with the adoption of such standards is how to implement desired coordination between individual elements such as modules that are defined within the respective standard. Often, engineers design custom code for each installation to perform the nuances of module coordination and communication. In prior systems, modules which are part of a uniform processing model such as S88 or S95 are developed where various code portions within the modules are designed or written by hand. This is repeated many times over as most systems implement several modules to produce a given product. As can be appreciated, it can be exceedingly costly to develop and implement code for each installation.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Module class subsets are provided where portions of a given module that were previously coded by hand have been identified and generated automatically for the designer in view of an identified class. The identified class represents an analysis of functional elements within the module that can be generically provided before system design/implementation. For example, Equipment or Phase Modules (or other type modules) can be decomposed into sub components and classes, thus allowing commonalty between equipment modules and other points of a module's extension to be identified. This allows building a limited number of equipment modules from the respective classes to address the large (virtually infinite) number of process or discrete applications. Example Equipment Modules provided include Generic, Material Transfer, and Equipment Verification. Respective Equipment Modules can communicate with associated Phase Modules which have also been developed according to a class structure. By identifying common portions of modules and codifying the respective portions in advance, code generation and development for the common portions identified is mitigated which in turn conserves resources for system designers and end users.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A reduced subset of module and phase components is provided to mitigate manual coding requirements of conventional systems that adhere to applicable standards. In one aspect, a system that facilitates module design in an industrial environment is provided. The system includes a module component that defines operations to control an industrial process. At least one class component is defined within the module that identifies a generic operation for the module, where the class component executes one or more of the operations within the industrial control process.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
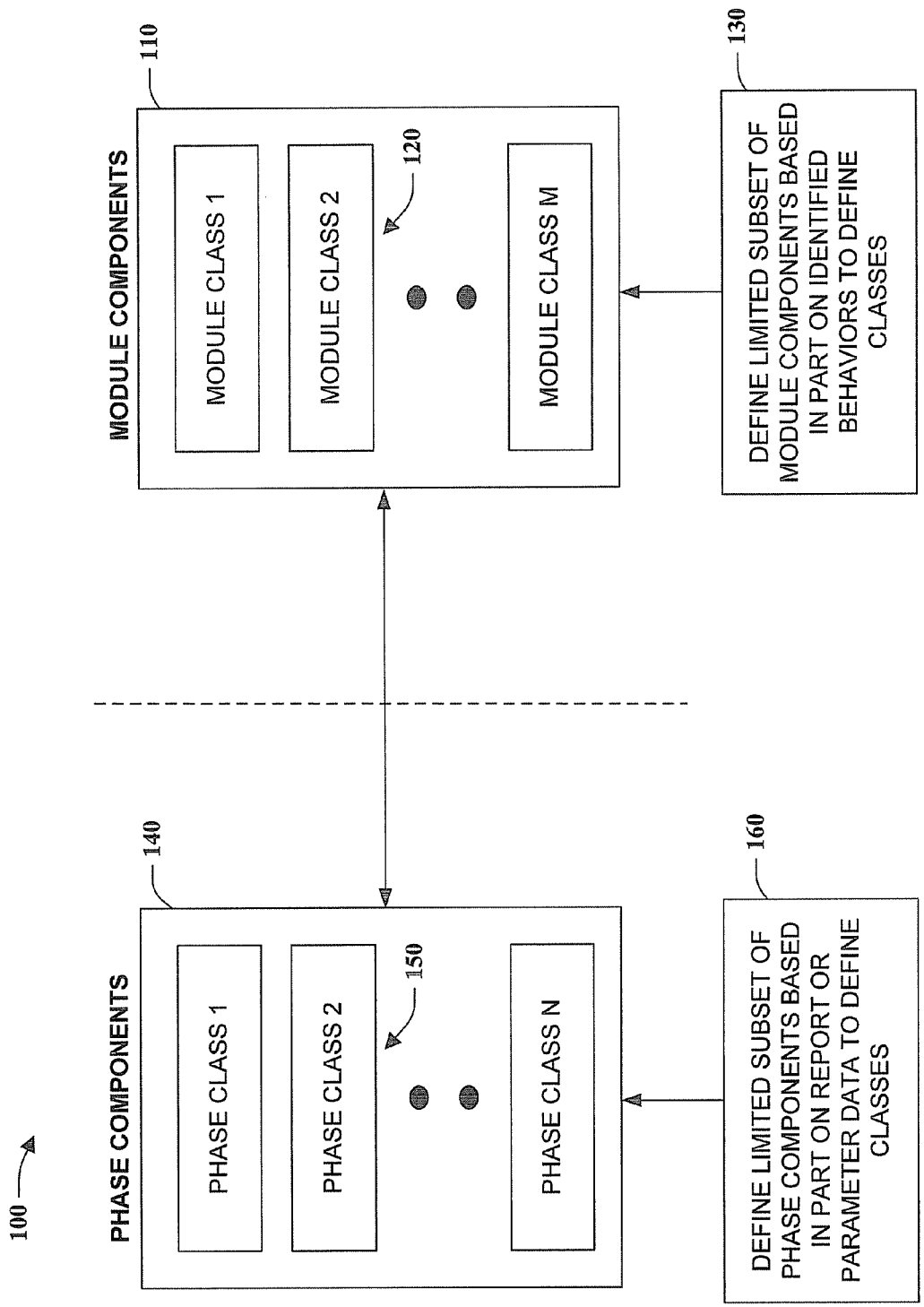
FIG. 1 is a schematic block diagram illustrating industrial control module and phase components for an industrial automation system.

Referring initially to FIG. 1, a system 100 illustrates module and phase components for controlling an industrial automation environment. One or more module components 110 include one or more module class components 120. The module class components 120 identify common functional portions of the module components 110 that can be identified and provided in advance to systems designers in order to mitigate coding or redesign of the module components themselves. As shown at 130, a limited subset or class of module components 110 can be provided to facilitate a substantially large number of control applications. This can include defining the limited subset at 130 based in part on identified module behavior for example. Similarly, one or more phase components 140 can also be provided that in turn include one or more phase class components 150. As with the module components 110, the phase class components 150 can identify common portions which can be provided in advance and form a limited subset or class of phase modules that can satisfy a large number of control applications. As shown at 160, a limited subset of phase modules 140 can be defined based in part on report or parameter data for example.

In general, the phase components 140 send control commands to the module components 110 and receive status there from. As will be described in more detail below with respect to FIGS. 2 and 3, the phase components 140 and the module components 110 can be broken into various classes such as interfaces, commands, status, parameters, and so forth. From such functional identifications via the classes, common module or phase elements can be defined allowing a limited class or subset of module and phase components to serve a large variety of control applications. In this manner, a large set of modules can be reduced to a limited subset defined by the identified classes.

Generally, module class subsets include portions of a given module or phase that were previously coded by hand and have been identified and generated automatically for the designer in view of an identified class. The identified class represents an analysis of functional elements within the module or phase that can be generically provided before system design/implementation. For example, Equipment or Phase Modules (or other type modules) can be decomposed into sub components and classes, thus allowing commonalty between equipment modules and other points of a module's extension to be identified. This allows building a limited number of equipment modules from the respective classes to address the substantially large number of process or discrete actions. Example Equipment Modules provided include Generic, Material Transfer, and Equipment Verification. Respective Equipment Modules can communicate with associated Phase Modules which have also been developed according to a class structure.

A limited number of equipment modules and equipment phases may be used with minimal customization to satisfy the majority of process action requirements although it is to be appreciated that other modules can be added to the subset. Behavior can be a determining factor in the classification of Equipment Modules, for example. The following table outlines example behavior for three example classes of Equipment Module.

|  | Material Transfer | Generic | Equipment Verification |
| --- | --- | --- | --- |
| Behavior | Ability to restart (e.g., Advance/Correct) | Momentary Latch/Unlatch | Confirmation of Unit Status |

Report/Parameter data can be a determining factor in the classification of Equipment Phases. The following table outlines an example data requirement for three classes of Equipment Phases.

|  |  | Material Transfer | Generic | Equipment Verification |
| --- | --- | --- | --- | --- |
| Parameter | | Setpoint<br>Positive Tolerance<br>Negative Tolerance | Setpoint | Equipment Status Expected |
| Report | | Exit Status | Exit Status | Exit Status<br>Equipment Status |
|  | | Actual Amount<br>Error<br>Initial Gross Weight | Actual | Actual |

-continued

| Material Transfer | Generic | Equipment Verification |
|---|---|---|
| Final Gross Weight Material Transfer Status | | |

As will be described in more detail below, the module components 110 or phase components 140 can be an association of logic with one or more resources. The logic includes program code that can alter the state of a resource; for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, run, reset, stop, restart, and so forth where the module can present logic to represent state machines that manage the state of the resource. During application, resource modules (described below) can take on the name of the resource that is the primary focus on the module. For example, an Equipment module is primarily focused on coordination of equipment but may involve personnel in the process. Similarly, a Personnel module is focused on coordination of personnel but may involve other resources in the process. A Control Module that manages a material may be referred to as a Material Control Module and so forth.

It is noted that components associated with the system 100 can include various computer or network components such as servers, clients, programmable logic controllers (PLCs), communications modules, mobile computers, wireless components, control components and so forth which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
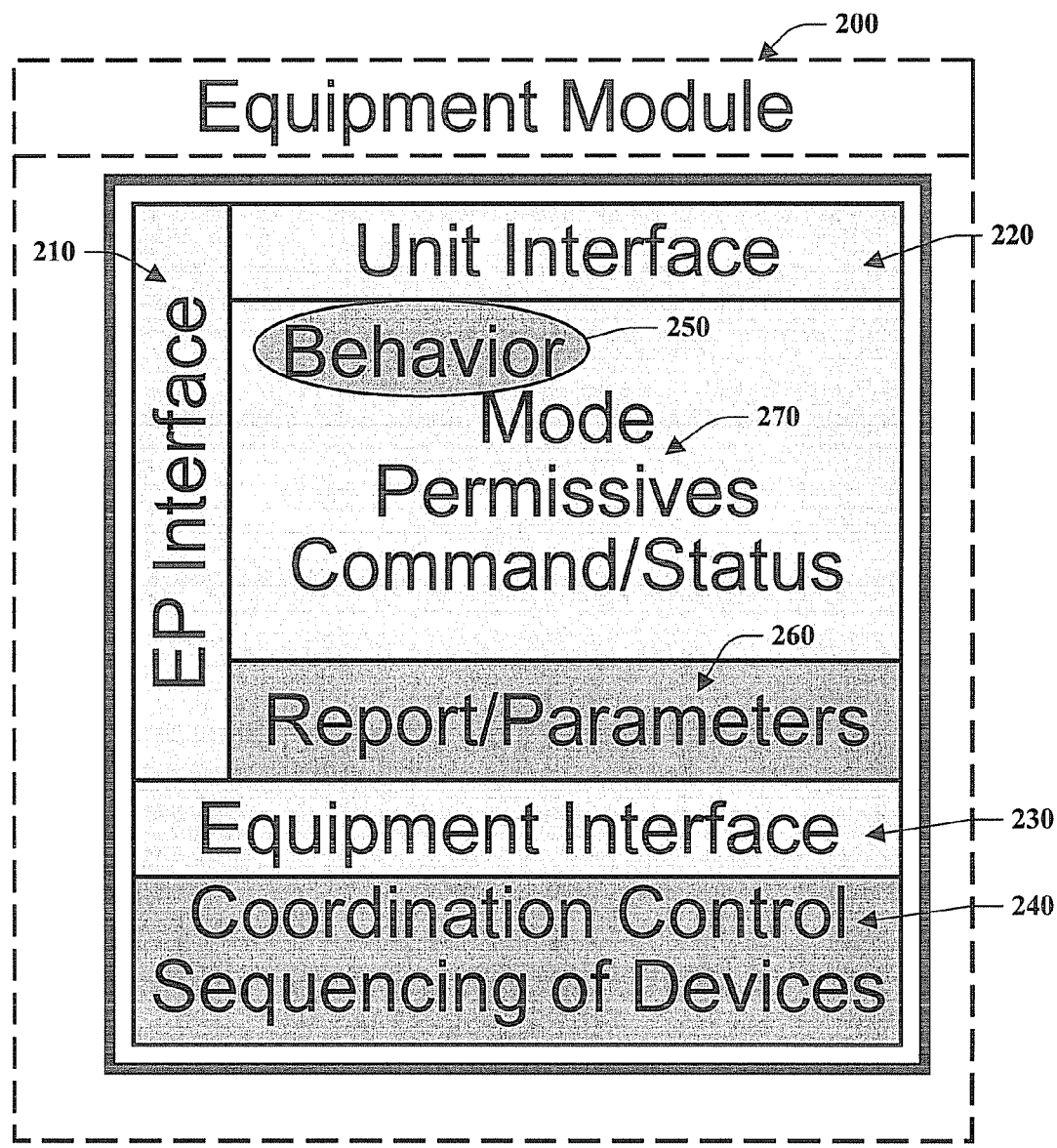
FIG. 2 is a block diagram of an example equipment module that has been functionally decomposed into class components.

Referring now to FIG. 2, an example equipment module 200 that has been functionally decomposed into respective class components is illustrated. It is to be appreciated that the equipment module 200 is exemplary in nature and that other types of modules and/or classes are possible. The equipment module 200 (EM) can include an equipment phase interface 210 that provides a linkage to/from an Equipment Phase (EP) which is described in more detail below with respect to FIG. 3. This interface 200 determines how the EM 200 interacts with the EP. A standard Equipment Phase interface 210 may be created that applies to all Equipment Module classes. These should provide a mechanism to pass report/parameter data and provide a simple interface between the Equipment Phase and the Equipment Module.

At 220, a Unit interface provides a linkage to/from a respective Unit such as described in a typical S88/S95 procedure. This interface 220 determines how the EM 200 interacts with the Unit. A standard Unit interface 220 may be created that applies to all Equipment Module classes. Equipment Modules 200 should be aware of their Unit, where the propagation of mode and faults may be facilitated via the Unit interface 220.

An Equipment interface 230 provides a linkage to/from Equipment (Subordinate EM's and control modules (CM's)). This interface 230 determines how the EM 200 interacts with Equipment. A standard equipment interface can be created that applies to the Equipment Module classes.

At 240, coordination control, and sequencing of devices refers to the logic associated with commanding the state of subordinate Equipment/Control modules. Generally, coordination and sequencing is facilitated via the Equipment Interface 210. Coordination and Sequencing may be achieved using a number of different methods, such as via hard coded logic or sequencer. The method is generally not considered part of the Equipment Module. Typically, coordination and sequencing is implementation dependant, and should not be used to determine the definition of class(es).

At 250, behavior describes the functional behavior of a particular Equipment Module 200. A number of the behaviors 250 exhibited by an Equipment Module 200 are common to Equipment Modules. Some equipment modules 200 may exhibit unique behavior. For instance, a Material Transfer may require the ability to restart in addition to under tolerance. Some differences in behavior 250 may be masked on/off using configuration commands. Generally, behavior 250 is a determining factor in establishing the definition of Equipment Module class(es).

At 260, parameters (e.g., process parameters) are data items which are provided by the recipe phase, via the Equipment Phase to the Equipment Module 200. Report (process results) data items at 260 are produced by the Equipment Module 200, and published to the Recipe Phase via the Equipment Phase interface at 210. Generally, equipment modules 200 inherit recipe parameters from Equipment Phases, and process these parameters. Equipment modules 200 produce report data at 260 and provide this data to the Equipment Phase via the interface 210. A standardized data structure may be created for parameter data within the Equipment Module 200. The Equipment Module 200 can also provide the capability to customize this data structure. A standardized data structure may be created for report data within the Equipment Module 200 which can also provide the capability to customize this data structure. Depending on the number of unique data sets required for report/parameters, the processing and production of this data may be a determining factor in the definition of Equipment Module class(es). As shown at 270, other class components in the equipment module 200 can include mode data, permissive data, and command/status data that can be passed to/from the respective interfaces associated with the equipment module.

Figure 3:
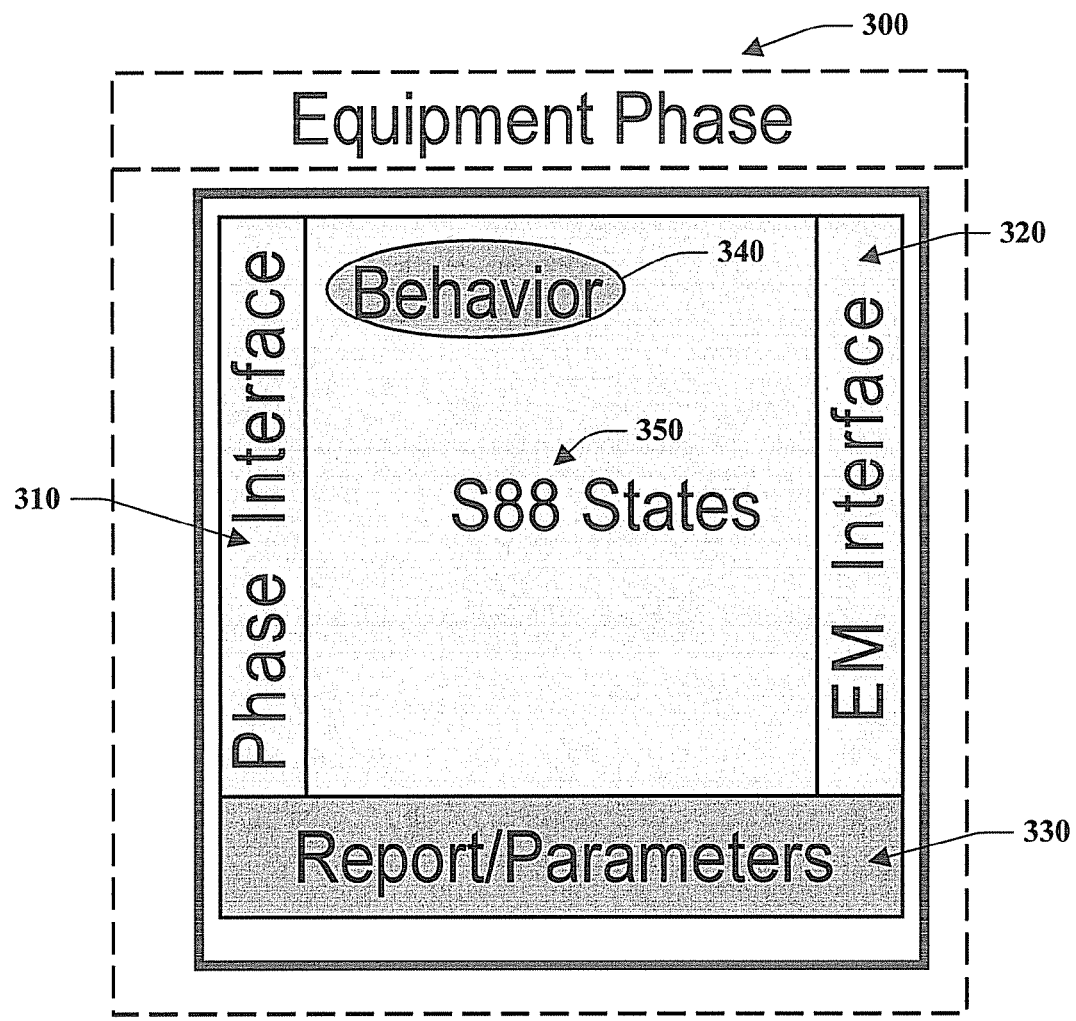
FIG. 3 illustrates an example equipment phase that has been functionally decomposed into respective class components.

Turning to FIG. 3, an example equipment phase 300 that has been functionally decomposed into respective class components is illustrated. The equipment phase 300 (EP) can interface with the equipment module described above with respect to FIG. 2. It is to be appreciated that the equipment phase 300 is exemplary in nature and that other types of phases and/or classes are possible.

A phase interface 310 provides a linkage to/from a respective Recipe Phase (not shown) to control a process. This interface 310 determines how the EP 300 interacts with the Recipe Phase. A standard Phase interface may be created that applies to all Equipment Phase classes, which supports the S88 state model, or subset of the S88 state model, for example. The phase interface should also provide a component to pass report/parameter data.

At 320, an Equipment Module interface provides a linkage to/from the respective Equipment Module such as depicted in FIG. 2. This interface determines how the EP 300 interacts with the Equipment module. A standard Equipment Module interface 320 may be created that applies to all Equipment Phase classes and should provide a component to pass report/parameter data.

At 330, parameters (process parameters) are data items which are provided by the recipe phase, to the Equipment Phase 300. The Equipment Phase 300 then provides this data to the Equipment Module. Report (process results) data items are produced by the Equipment Module, and published to the Equipment Phase 300. The Equipment Phase then provides this data to the Equipment Phase. Generally, Equipment modules inherit recipe parameters from Equipment Phases. Such modules also produce report data and provide this data to the Equipment Phase 300. Depending on the number of unique data sets required for report/parameters 330, the processing and production of this data may be a determining factor in the definition of Equipment Module class(es).

At 340, behavior describes the functional behavior of a particular Equipment Module. Generally, the Equipment Phase 300 should support the S88 state model, a subset of the S88 state model, or similar models. Typically, all Equipment Phases exhibit similar behavior. Differences in behavior may be masked on/off using configuration. Behavior 340 is generally not a determining factor in establishing the definition of Equipment Module class(es) described above. As shown, one or more S88 states may be controlled at 350.

Figure 4:
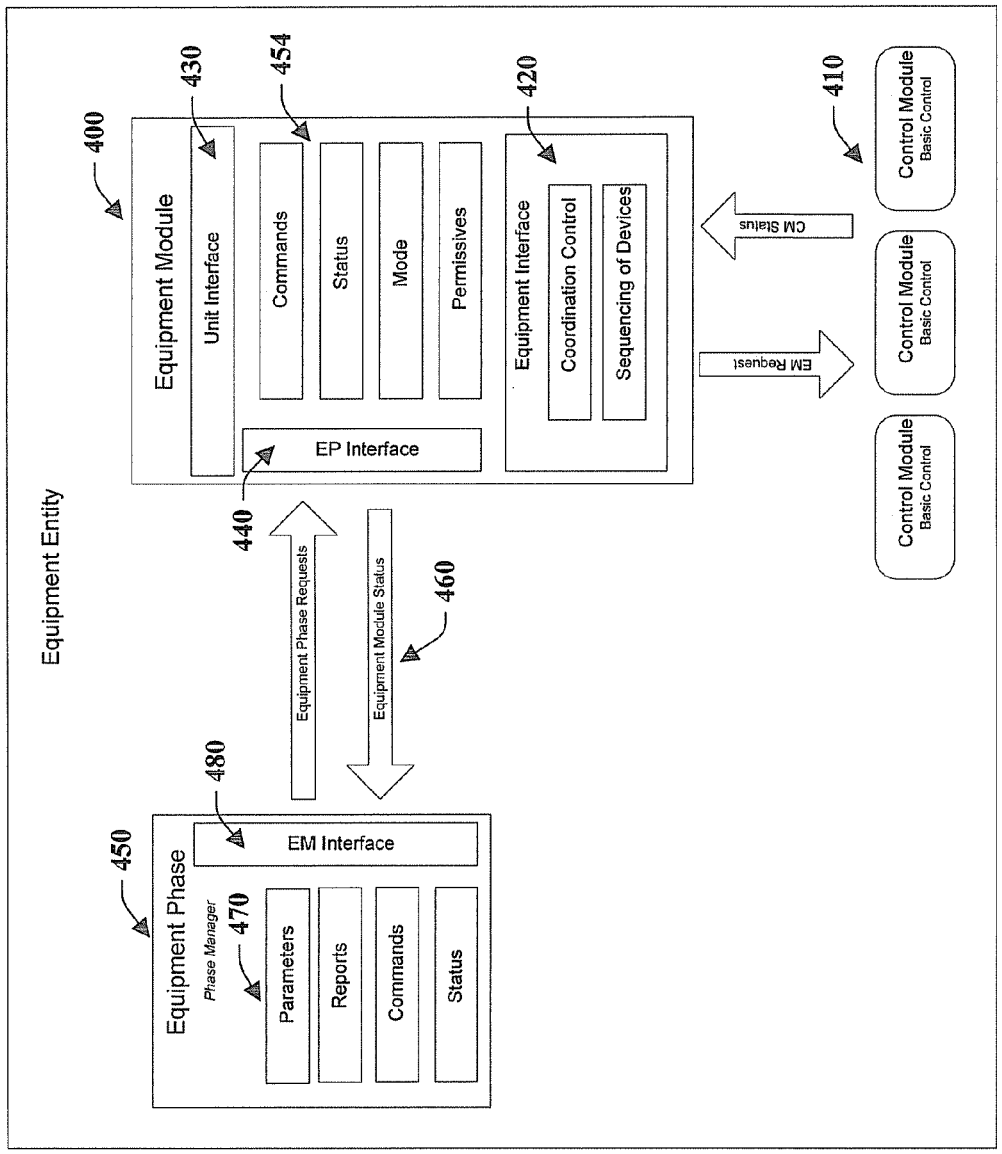
FIG. 4 illustrates example equipment module and equipment phase interactions.

Referring to FIG. 4, example equipment module and equipment phase interactions are illustrated. As shown, an equipment module 400 sequences and coordinates equipment via one or more control modules 410. Similar to above, the equipment module 410 may include an equipment interface 420, a unit interface 430, and an equipment phase interface 440 that interacts with a respective equipment phase 450. The equipment module 410 may also include components for commands, status, modes (e.g., manual versus automatic, fault, reset), and/or permissives as shown at 454. The equipment module 400 and the equipment phase 450 exchange phase requests and status at 460. As shown the equipment phase 410 can include parameters, reports commands, and/or status at 470 which are exchanged via an equipment module interface 480. The following functions and concepts can be applied to the Equipment Module class:

Data Structure—This Equipment Module—Equipment Verification is structured in a fashion that allows an individual to easily find and understand information issued to and produced by this module. For example, commands can be grouped in a common section, status is given in a separate section, and configuration parameters are grouped together as well.

States—An Equipment Module—Equipment Verification acts as a state machine for a particular grouping of equipment. The actual states are defined during implementation. Equipment Module—Equipment Verification states may be initiated by an Equipment Phase, but an Equipment Module's states does not need to follow the S88 state model.

Modes—This module functions via the control system in auto or manual mode.

Commands—An Equipment Module—Equipment Verification is commanded to a state by a state change request. In MANUAL mode this is a manual request. In AUTOMATIC mode this is an auto request.

Status—For each requested state the state machine can latch control module requests required to bring the EM to defined state. At this time the state machine will be in a MOVING state. This can be seen on the EM faceplate. When the control modules move to the requested state, the state machine can command the current state to the requested state and the face place can indicate that the module is no longer moving but in the requested state.

Faults & Warnings—Module Fault section. This section has the following subsections:

Control Module Faults section. A fault of Control Module under the control of the EM can generate an Equipment Module fault.

Process Fault Section. Any other system condition which should generate an EM fault State Machine section. At a given time an EM is either in Fault Mode or one of the states defined for the module.

Interlocks—If the process or safety interlocks are lost, the Equipment Module—Equipment Verification is de-energized. A process interlock bypass configuration has been provided to circumvent any process interlocks for the device. If at any time during energized operation of the device either interlock is not present, a device failure will occur.

Simulation—Equipment Module—Equipment Verification simulation is achieved indirectly within subordinate Control Modules.

Configuration—By modifying an Equipment Module—Equipment Verification instance's configuration data, the behavior of a particular module instance can be modified. When all module configurations are considered valid, an individual of appropriate authorization level may save the current settings. If the Equipment Module—Equipment Verification configuration settings deviate from the saved setting, an indication will appear on the HMI faceplate. An authorized individual will then have the opportunity to save current configurations or restore the previously saved configuration.

Figure 5:
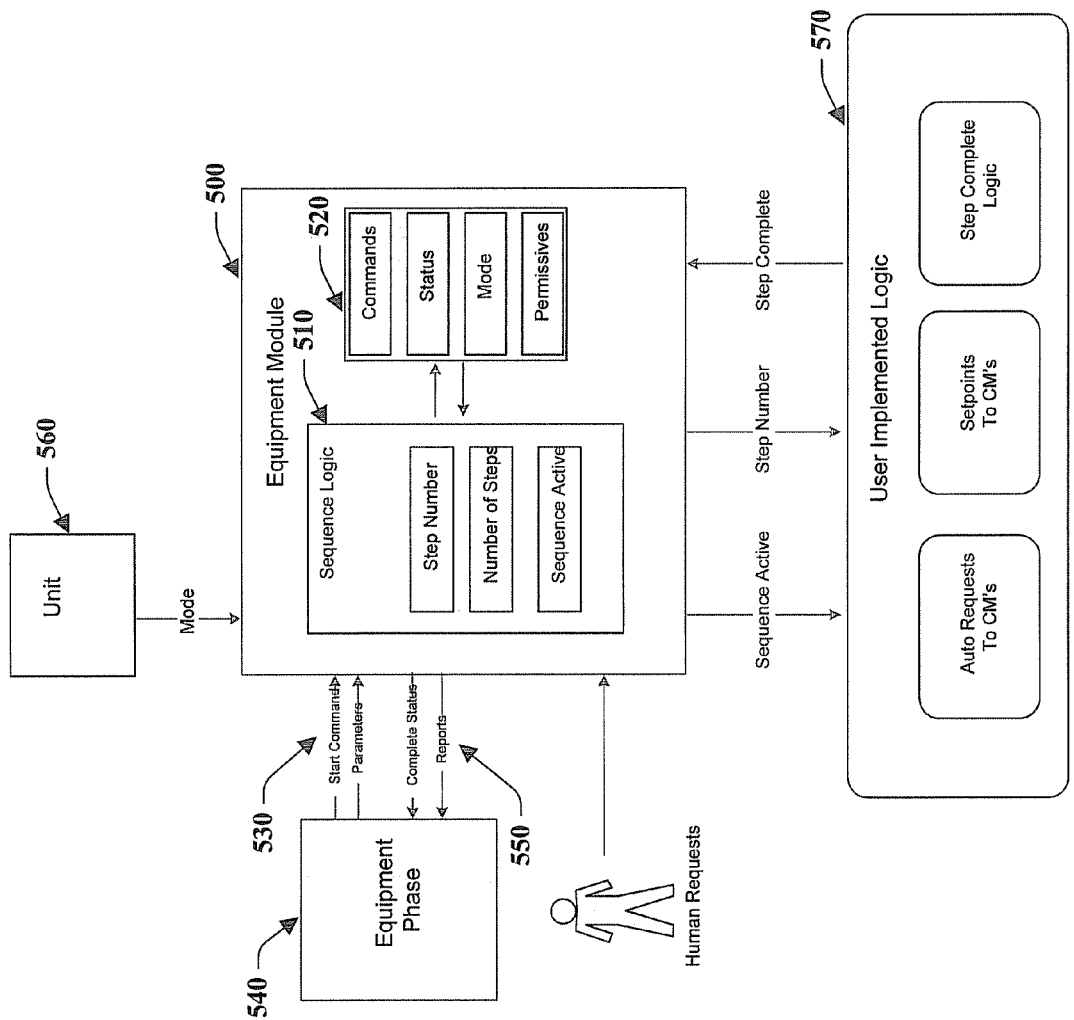
FIG. 5 illustrates state processing aspects between equipment modules and equipment phases.

Turning to FIG. 5, state processing aspects between equipment modules and equipment phases are illustrated. An equipment module 500 includes sequence logic 510 having step numbers, number of steps, and sequence actions, that interact with various commands, status, modes, and permissives at 520, where permissives define conditions that allow or prevent users/machines from taking actions. The sequence logic 510 receives commands 530 from an equipment phase 540 and transmits status at 550 to the equipment phase. As shown, at least one unit 560 interfaces to the equipment module 500. As commands are generated by the equipment phase 540, states are commanded to one or more control modules at 570. In this example at 570, user implemented logic processes auto requests, set point controls, and provides step completion logic. As can be appreciated, other configurations and controls can be provided.

Figure 6:
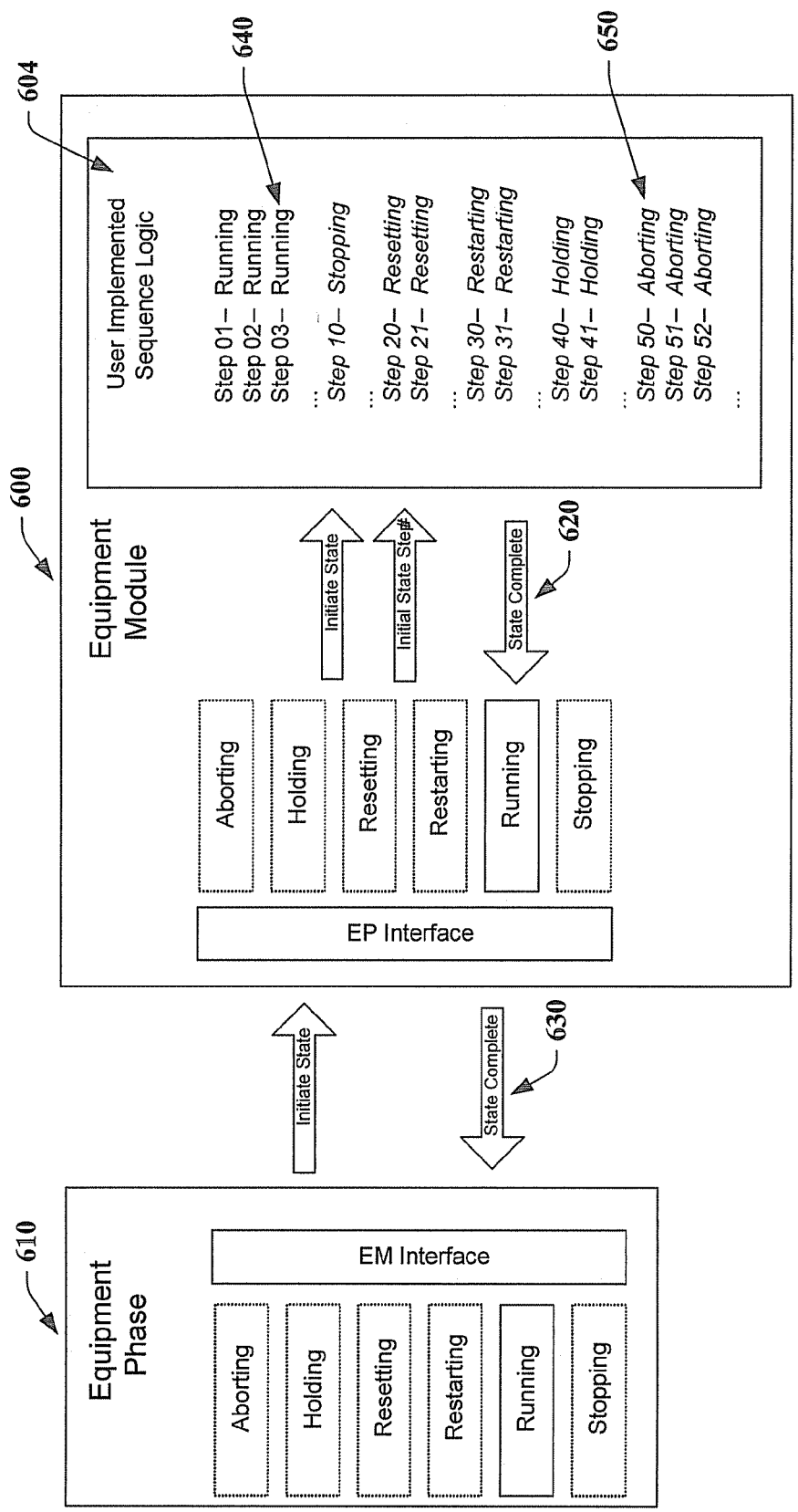
FIG. 6 illustrates example state processing between phase and equipment modules.

Proceeding to FIG. 6, example state processing is shown between phase and equipment modules. An Equipment Module 600 includes core logic 604 that manages an initial step number selection for each of the defined transient phase states provided from at least one equipment phase 610. Such logic 604 can be responsible for setting the transient phase state complete bit at 620, for example. The Equipment Module 600 can then report back to the Equipment Phase 610 that the corresponding transient phase's state is complete at 630. Generally, a user implemented sequence can be written using steps 1 to 99, for example. For each of the states that the user chooses to implement, the Equipment Module 600 can store the initial step number for this state. When a state change is detected by the Equipment Module 600, it can set an active state status bit and on a one-shot set the current step number equal to the state initial step number.

As an example, if an Equipment Module 600 is in the Running state on step 03 of its sequence at 640 and a request is received by the Equipment Module for a state change to Aborting, Equipment Module 600 can change the active state status bit to Aborting and on a one-shot transition the current step number to 50 at 650. This example assumes that the user has chosen to write the Running logic steps starting at 01 and the Aborting logic steps starting at 50, as illustrated at 604. As can be appreciated, a plurality of various state sequences and commands can be executed (e.g., aborting, holding, resetting, restarting, stopping, and so forth).

Figure 7:
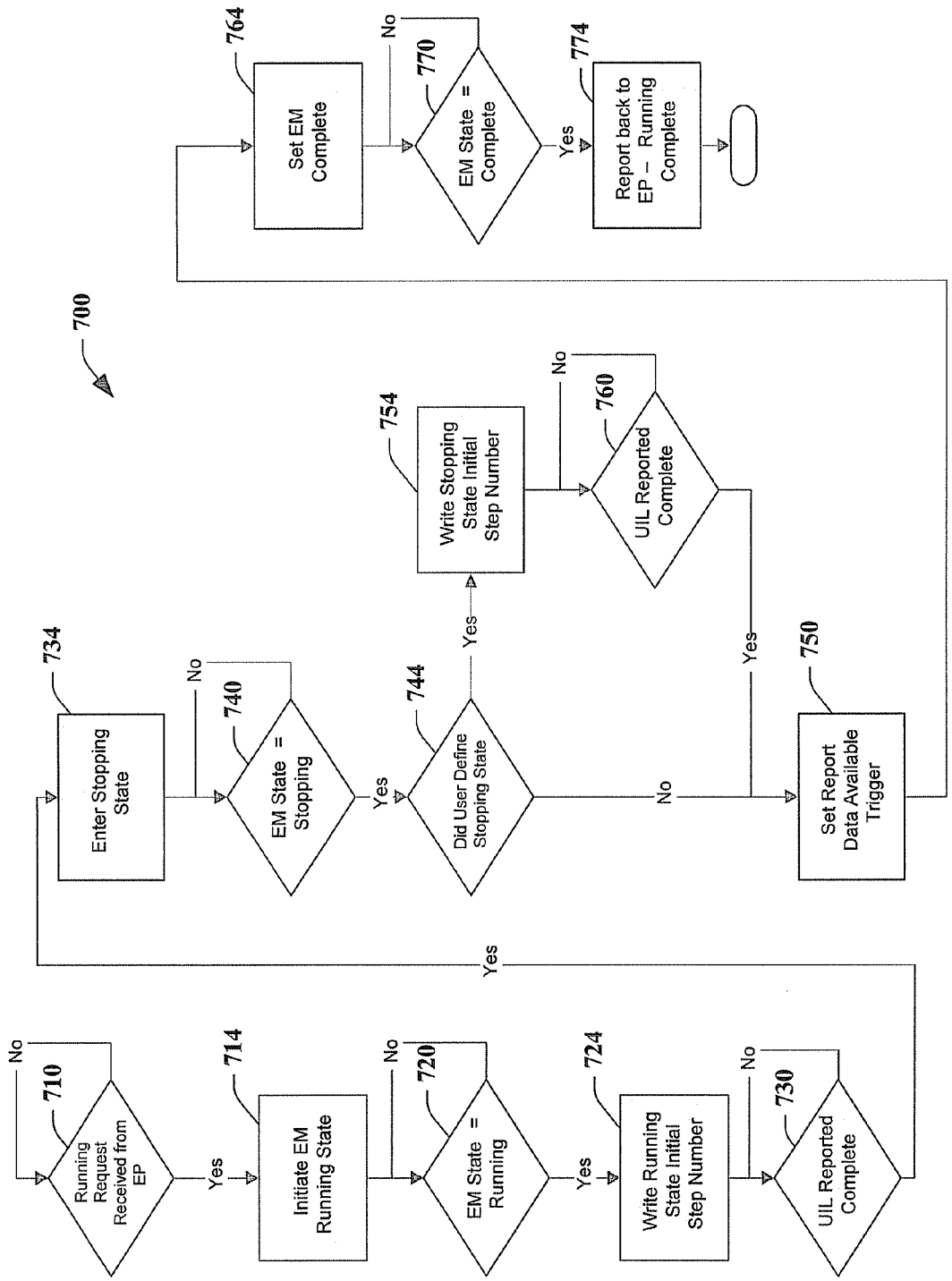
FIG. 7 is a flow diagram illustrating a state processing methodology.

FIG. 7 illustrates a state processing methodology 700 for an industrial automation system. While, for purposes of simplicity of explanation, the methodology is shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 710, a decision is made as to whether or not a running request is received from an equipment phase. If no request is received at 710, the process loops back to 710 and waits for a received request. If a request is received at 710, the process proceeds to 714 and initiates an equipment module running state. At 720, the process determines such as via status information if in fact the equipment module has made it to the running state. If not, the process waits for status at 730. If the equipment module has made it to the running state at 720, the process proceeds to 724. At 724, the process writes and initial step number for the running state. At 730, a test is made to determine if user interface logic (UIL) has reported complete. If not, the process waits at 730 for suitable status. If the UIL has completed at 730, the process proceeds to 734.

At 734, the process 700 enters a stopping state and proceeds to 740 where a test is made to determine whether the equipment module has stopped. If the module has not stopped, the process remains at 740 and continues to test for the stopping event. When a stopping event has been detected at 740, the process proceeds to 744 and determines whether the user has defined a stopping state. If not, the process proceeds to 750 and sets a report data available trigger. If the user has defined a stopping state at 744, the process proceeds to 754 and writes a stopping state initial step number. At 760, the process checks to determine if the user interface logic (UIL) has reported complete. If not, the process remains at 760. It the UIL has completed at 760, the process proceeds to 750 where a report data available trigger is set. Proceeding to 764, an equipment module complete status flag is set. At 770, a test determines whether or not the equipment module state is complete. If not, the process waits at 770 for the state to complete. Upon completion at 770, status is sent to the equipment phase that reports that the running state has completed. As can be appreciated, other states than running can be similarly processed between an equipment phase and an equipment module. Also, multiple equipment phase and modules can be employed wherein more than one phase communicates to one or more modules and visa versa.

Figure 8:
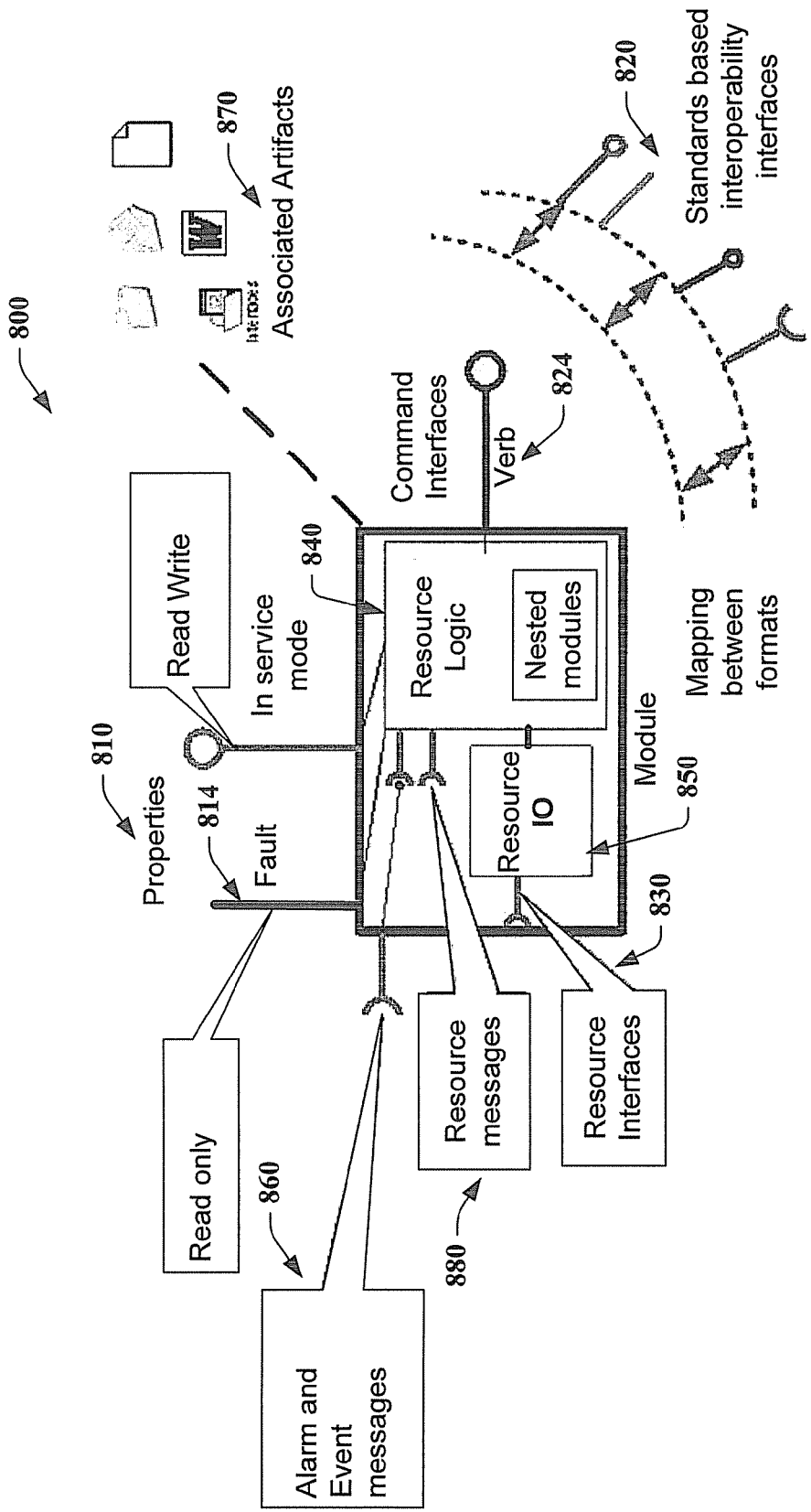
FIG. 8 is a diagram illustrating module attributes.

Referring now to FIG. 8, module attributes 800 are illustrated. The attributes 800 depicted in FIG. 8 include a common (or exemplary) representation that can be modules from modules. Generally, a set of standard attributes can be determined that are common to all modules. Similarly, for other types of modules described below, additional standard attributes can be defined. An example of a property 810 available on modules includes attributes such as Fault and Status at 814. Active resource modules (e.g., equipment and personnel) can support additional properties 810 such as available/unavailable.

Attributes presented below are represented associations from the module to objects which may be internal in a common data model or elsewhere (e.g., CAD Files). At 820, standard public interfaces can be provided. These interfaces 820 publish verbs 824 that are available to external systems and are documented activities that hide the complexity of the underlying code used to implement the interface. Interfaces 820 can be considered into at least two common usage scenarios. For example, interfaces 820 can be used as access points that can be used to hook in real time diagnostics, security and so forth.

Public verbs 824 initiate an action within the module. The activity is described to clients of the interface 820. The implementation is considered private and is not presented to clients—for example, Open, Stop, Abort, Shut, and so forth. A data value property 810 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 810 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 820. e.g., Conversion Map, Name, Description, expiry date, personnel contact information. Some properties 810 can be common to all instances of resource modules (e.g., scanned copy of resource specification documents), whereas other properties 810 are specific to each module instance (e.g., Status, percent open).

At 830, internal resource interfaces include interfaces from logic 840 in the module to the resource being managed at 850, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 830 are internal to the module enabling the module's public interfaces 820 and properties 810 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 820 to runtime systems may then consider these interfaces as internal.

At 860, alarm and event messages can be provided which include messages that exposed as runtime messages visible to external systems during the execution of the module. This includes alarms and events explicitly coded by the developer and system messages promoted to be visible by external systems. At 870, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 880, system messages allow modules to listen for and publish data model messages to external components. Inbound messages are typically used to manage modules (configure, initialize, propagate properties, and so forth) and publish messages on module activity (resource state, data model messages, and so forth).

Figure 9:
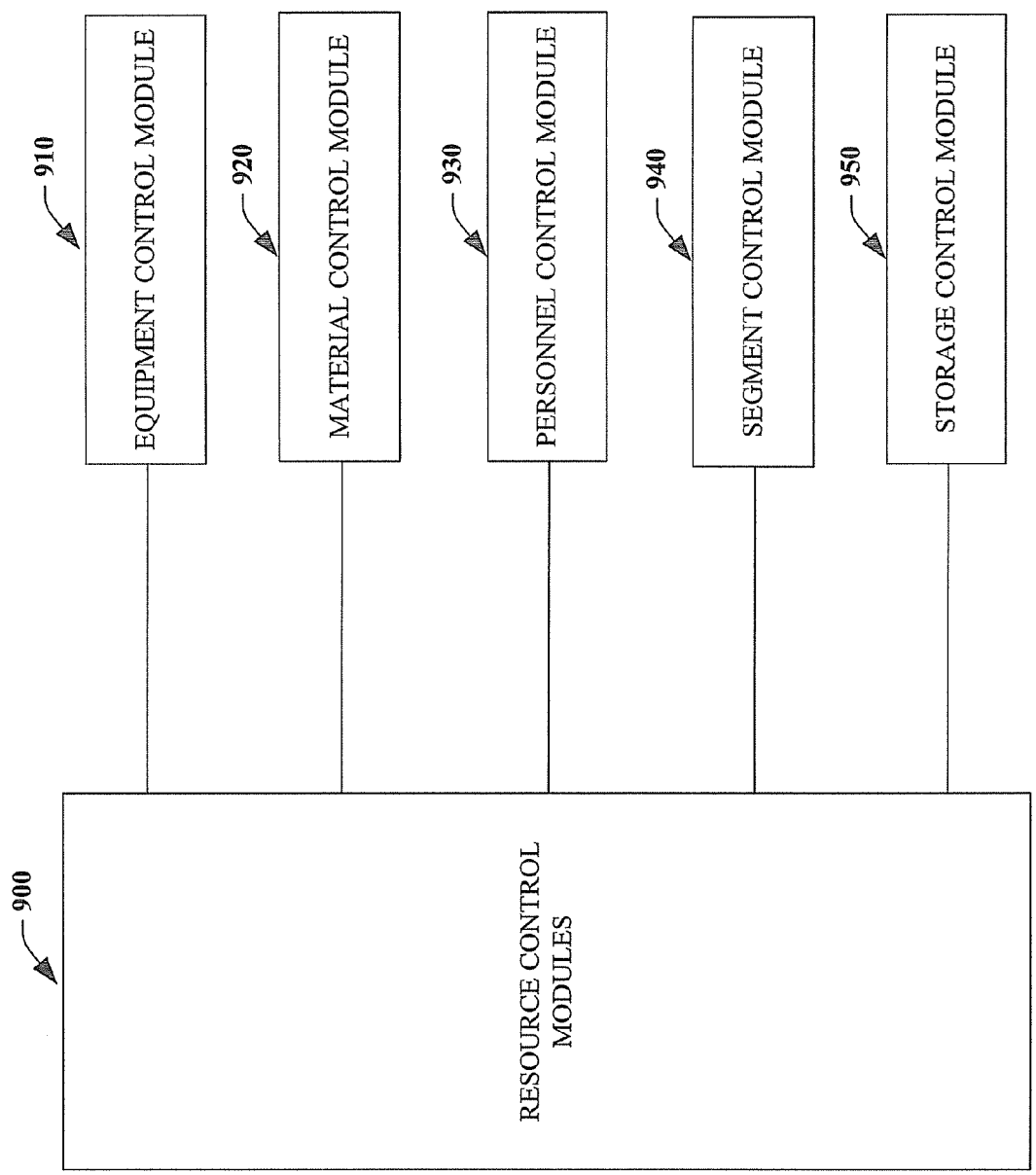
FIG. 9 is a diagram illustrating example resource control modules.

Turning to FIG. 9, example resource control modules 900 are illustrated. In general, resource control modules 900 provide simple control of one or more resources. The resource control module (RCM) 900 represents the logic to manage the state or data of the resource and may contain other resource control modules to achieve its respective functionality. The RCM 900 provides public interfaces via actions and properties. In some cases, an action may be a simple bit value or a request value that is interfaced to internal values in the module and in other cases more complex logic can be provided. The RCM 900 can include other resource control modules and may promote a command to be represented as segment resource control interface. Example forms of the RCM 900 include:

At 910, an Equipment Control Module (Common name="Control Module") CM. The simplest form of basic regulatory control of equipment. Encapsulating the equipment and its control such as control of values, drives, and so forth. At 920, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 930, a Personnel Control Module (PCM) is provided. This includes management of individual people such as Active, Idle, Break states directly or via shift schedules. This also includes data associated with people such as shift time patterns, for example. Other attributes that may be managed by PCM 930 are a person's location in a plant (GPS), qualification checks, or current assignment, for example. At 940, a Segment Control Module (SCM) includes manipulation of simple segment tasks such as piping paths, AGV paths, device state machines, robotic sequences and so forth. The SCM 940 typically performs an action on one segment such as next step to execute after the current step. At 950, a Storage Control Module (STGCM) includes Manipulation of simple storage logic such as buffer capacity and ordering into and out of a queue for the respective storage unit or requirement.

Figure 10:
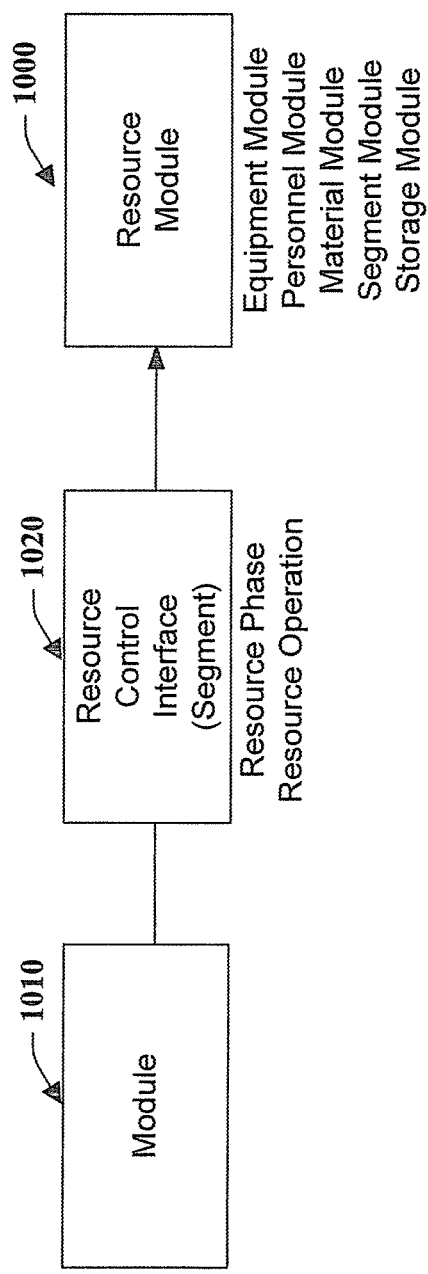
FIG. 10 is a diagram illustrating a resource module.

FIG. 10 illustrates a resource module 1000 for an industrial control system. Resource modules 1000 extend resource control modules described above to enable coordination of resources (equipment, people, modules and so forth). As shown, the resource control module 1000 includes a module 1010 and a resource control interface 1020. Resource modules 1000 are also able to represent more complex activities than resource control modules. For example, resource modules may include other resource control modules at 1010 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 11:
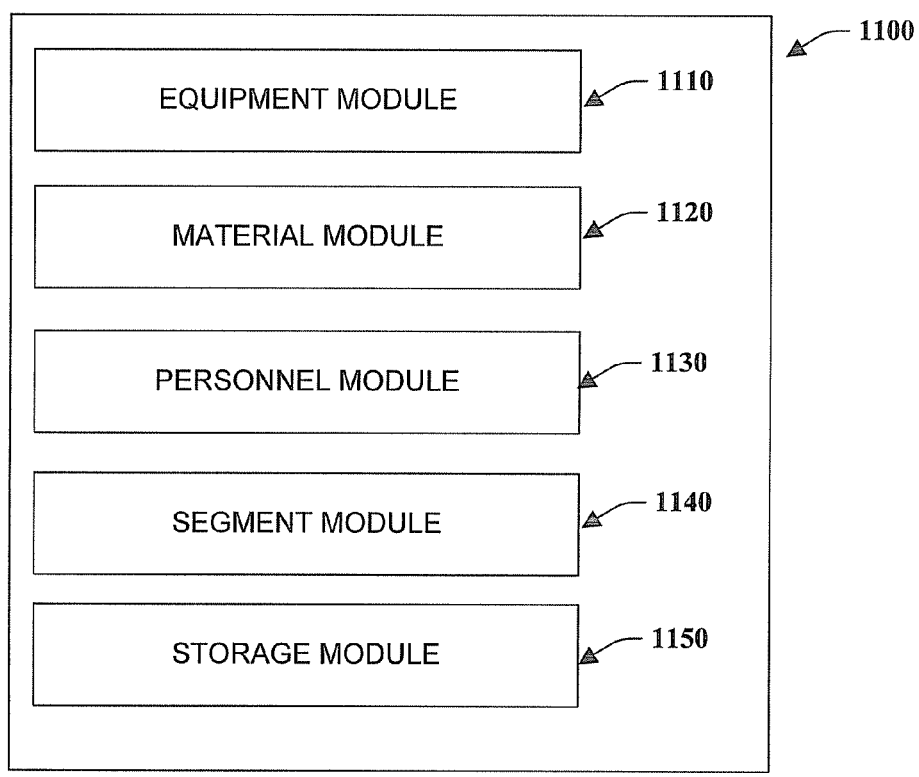
FIG. 11 is a diagram illustrating example resource modules.

FIG. 11 illustrates example resource modules 1100 for an industrial control system. At 1110, an Equipment Module provides coordination of equipment modules and equipment control modules to perform a process-orientated task independent of specific material e.g., In-feed, AGV controller, Conveyor, and so forth. At 1120, a Material Module provides coordination of material modules and material control modules to perform material focused tasks e.g., Material reservation, provision, material mass balance calculation, Bill of Material management, Work order management, and so forth. At 1130, a Personnel Module provides coordination of personnel modules and personnel control modules to perform personnel focused tasks e.g., Electronic signature collection, Security validation, certification validation, Manual control interactions, and so forth.

At 1140, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 1140 may also construct a sequence to be followed that can be applied as manual, automatic or semi automatic sequences (e.g., Route, recipe execution) At 1150, a Storage Module provides coordination of storage related activities, allocation of storage to requestors, modeling of inventory calculations and so forth. This also includes interaction with higher-level systems that manage storage and inventory information.

Figure 12:
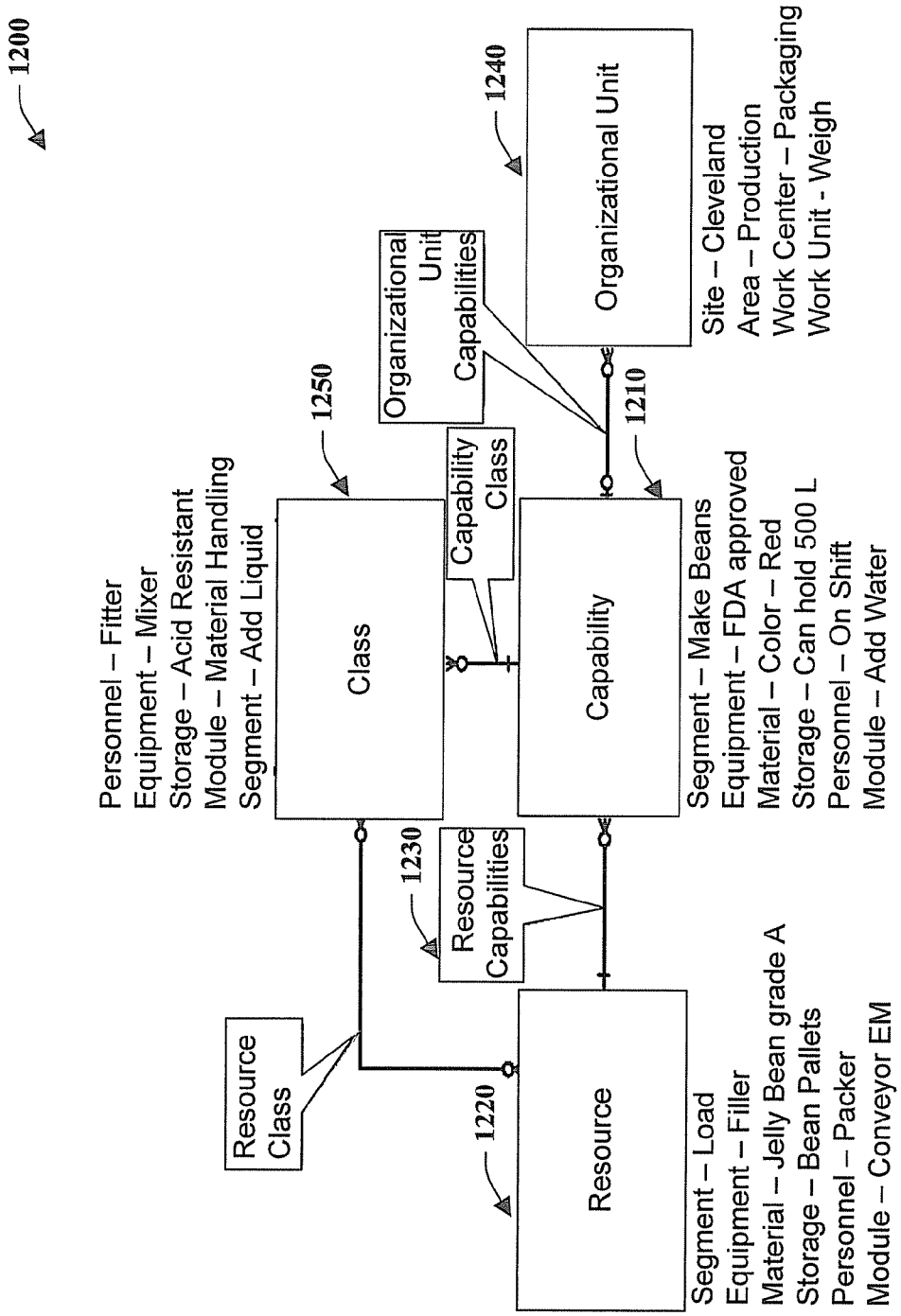
FIG. 12 is a diagram illustrating a resource control model.

FIG. 12 illustrates an example resource control model 1200 for an industrial control system. Resource Control Interfaces are the interfaces exposed to production management systems for resource binding and arbitration purposes. The interfaces are elements of the resource control model 1200 including procedures, operations or phases. These interfaces are made available by exposure via one or more capabilities 1210 described below. Procedures, operations and phases depicted in this model 1200 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1220 such as material, equipment, personnel are considered during the binding process of product production rules to work centers (production lines, process cells, and so forth). These selection processes evaluate resource capabilities to locate the appropriate resource for the task.

Resource capabilities 1210 include the resource 1220 required to perform work in a production system. Consequently, resources 1220 are at the centre of, efficiency, capacity, scheduling and arbitration considerations. A resource's ability to work or be available to allow work to commence is represented as resource capability at 1230. The existence of capability 1230 associated with a resource 1220 does not make the resource available for production; the resource's capability 1230 is associated with organizational units 1240 that are will support the respective resource capability. For example, an operator (personnel resource) may have qualifications for a Mixer in line 1, where this qualification capability is only in effect with that specific mixer unless explicitly directed. Resource arbitration algorithms can search for resource capabilities 1230 in the scope of organizational units 1240 they are to be executed within.

Resources 1220 publish capabilities to organizational units 1240 for use by system processes in a given scope. Modules are a type of resource and can be accessed directly by published capabilities 1210. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1210. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1200, the resource 1220 and capability can be associated with a higher-level class or abstraction 1250.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates module design in an industrial environment, comprising:
   one or more processors; and
   a memory communicatively coupled to the one or more processors, the memory having stored therein computer-executable components to implement the system, the computer-executable components comprising:
   a library comprising a plurality of equipment modules and a plurality of equipment phase modules, wherein:
      the plurality of equipment modules respectively comprise one or more class components that codify at least one portion of equipment module functionality relating to control of an industrial process, the one or more class components comprising at least an equipment phase interface component that is common to the plurality of equipment modules,
      the plurality of equipment phase modules respectively comprise one or more phase class components that codify at least one portion of equipment phase functionality, the one or more phase class components comprising at least an equipment module interface component that is common to the plurality of equipment phase modules, and
      the equipment phase interface component is configured to receive parameter data from the equipment module interface component of an equipment phase module, of the plurality of equipment phase modules, for control of sequence logic executed by an equipment module, of the plurality of equipment modules.

2. The system of claim 1, wherein the plurality of equipment modules further respectively comprise, as the one or more class components, at least an equipment interface component configured to exchange data between the plurality of equipment modules and at least one of a subordinate equipment module or a control module.

3. The system of claim 2, wherein the plurality of equipment modules further respectively comprise, as the one or more class components, at least a coordination and control component configured to control a state of at least one of the subordinate equipment module or the control module via the equipment interface component.

4. The system of claim 1, wherein the plurality of equipment modules further respectively comprise, as the one or more class components, at least a behavior component that defines one or more functional behaviors of the plurality of equipment modules.

5. The system of claim 4, wherein the library classifies the plurality of equipment modules as at least one of a material transfer module, a generic module, or an equipment verification module according to the one or more functional behaviors.

6. The system of claim 1, wherein the equipment phase interface component comprises a standardized interface that facilitates exchange of report data indicating state activity for the plurality of equipment modules.

7. The system of claim 1, wherein the plurality of equipment modules further respectively comprise, as the one or more class components, at least one of a mode component, a permissive component, a command component, or a status component.

8. The system of claim 1, wherein the plurality of equipment phase modules are configured to generate request data comprising an equipment phase request and to send the data to one of the plurality of equipment modules via the equipment phase interface component.

9. The system of claim 1, wherein the one or more phase class components further comprise at least a behavior component that defines one or more functional behaviors of the plurality of equipment phase modules.

10. The system of claim 1, wherein the plurality of equipment phase modules at least one of send parameter data to the equipment module or receive report data from the equipment module via the equipment module interface component.

11. The system of claim 10, wherein the library classifies the plurality of equipment phase modules as at least one of a material transfer phase module, a generic phase module, or an equipment verification phase module according to at least one of the parameter data or the report data respectively associated with the plurality of equipment modules.

12. The system of claim 1, wherein the sequence logic comprises one or more sequence steps and is controlled at least in part by a command received from the equipment phase module via the equipment phase interface component.

13. The system of claim 12, wherein the plurality of equipment modules are configured to send status data generated by the sequence logic to the equipment phase module via the equipment phase interface component.

14. The system of claim 1, wherein the equipment phase interface component is further configured to send status data generated by the equipment module to the equipment module interface component of the equipment phase module.

15. A method for generating modular control components, comprising:
    selecting, by a system comprising one or more processors, an equipment module from a plurality of equipment modules that respectively comprise one or more class components that define at least a portion of control functionality, wherein the one or more class components comprise at least a standardized equipment phase interface component that is common to the plurality of equipment modules;
    selecting an equipment phase module from a plurality of equipment phase modules that respectively comprise one or more phase class components that define at least a portion of equipment phase functionality, wherein the one or more phase class components comprise at least a standardized equipment module interface that is common to the plurality of equipment phase modules; and
    receiving, by the equipment module, parameter data from the equipment phase module via the standardized equipment phase interface component of the equipment module, wherein the parameter data facilitates control of sequence logic executing on the equipment module.

16. The method of claim 15, further comprising executing the sequencing logic to control at least one device comprising the a portion of an industrial process.

17. The method of claim 15, further comprising classifying the plurality of equipment modules based at least in part on respective behaviors associated with the plurality of equipment modules.

18. The method of claim 15, further comprising processing at least one International Society of Automation S88.01-1995 (S88) state associated with the equipment module.

19. The method of claim 15, further comprising sending, by the equipment module, report data generated by the equipment module to the standardized equipment module interface component of the equipment phase module via the standardized equipment phase interface component.

20. A non-transitory computer-readable medium having stored thereon computer-executable components, comprising:
    a set of equipment modules respectively comprising one or more first functional components relating to control of an industrial process and respectively classified as a member of one or more classes, wherein the set of equipment modules are respectively configured to employ the one or more first functional components to perform control of at least a portion of the industrial process, and wherein the one or more first functional components comprise at least an equipment phase interface component that is common to the set of equipment modules; and
    a set of equipment phase modules that respectively comprise one or more second functional components relating to equipment phase functionality, and wherein the one or more second functional components comprise at least an equipment module interface component that is common to the set of equipment phase modules,
    wherein the equipment phase interface component encodes functionality that allows the set of equipment modules to receive parameter data from the equipment module interface component.

21. The non-transitory computer-readable medium of claim 20, wherein the one or more first functional components further comprise at least one of a mode component, a permissive component, a command component, a status component, a report component, a parameter component, a coordination component, or a sequence component.

22. The non-transitory computer-readable medium of claim 20, wherein the one or more first functional components further comprise at least an equipment interface component that is common to the set of equipment phase modules and configured to exchange data between the set of equipment modules and at least one of a subordinate equipment module or a control module.

23. The non-transitory computer-readable medium of claim 22, wherein the one or more first functional components further comprise at least a coordination and control component configured to control a state of at least one of the subordinate equipment module or the control module via the equipment interface component.

24. The non-transitory computer-readable medium of claim 20, wherein the one or more first functional components further comprise at least a behavior component that defines one or more functional behaviors of the set of equipment modules.

* * * * *